United States Patent
Nassi et al.

(10) Patent No.: US 10,649,782 B2
(45) Date of Patent: May 12, 2020

(54) APPARATUS AND METHOD FOR CONTROLLING BRANCH PREDICTION

(71) Applicant: Arm Limited, Cambridge (GB)

(72) Inventors: Luca Nassi, Antibes (FR); Houdhaifa Bouzguarrou, Valbonne (FR); Guillaume Bolbenes, Antibes (FR)

(73) Assignee: Arm Limited, Cambridge (GB)

(*) Notice: Subject to any disclaimer, the term of this patent is extended or adjusted under 35 U.S.C. 154(b) by 62 days.

(21) Appl. No.: 15/939,827

(22) Filed: Mar. 29, 2018

(65) Prior Publication Data
US 2019/0303161 A1 Oct. 3, 2019

(51) Int. Cl.
*G06F 9/32* (2018.01)
*G06F 9/35* (2018.01)
(Continued)

(52) U.S. Cl.
CPC ........ *G06F 9/3844* (2013.01); *G06F 9/30054* (2013.01); *G06F 9/35* (2013.01);
(Continued)

(58) Field of Classification Search
CPC ........ G06F 9/3844; G06F 9/35; G06F 9/3832; G06F 9/3842; G06F 9/3846; G06F 9/3848; G06F 9/355; G06F 9/3557; G06F 9/3806; G06F 9/3808; G06F 9/3861; G06F 21/52; G06F 21/54; G06F 21/6218; G06F 12/0684; G06F 12/121; G06F 12/122; G06F 12/123
(Continued)

(56) References Cited

U.S. PATENT DOCUMENTS 5,313,634 A * 5/1994 Eickemeyer ........ G06F 9/30054
712/240
5,864,707 A 1/1999 Tran et al.
(Continued)

OTHER PUBLICATIONS

Arm Limited, Whitepaper "Cache Speculation Side-channels" Version 1.2, Feb. 2018, pp. 1-13.
(Continued)

*Primary Examiner* — Daniel H Pan
(74) *Attorney, Agent, or Firm* — Nixon & Vanderhye P.C.

(57) ABSTRACT

An apparatus and method are provided for controlling branch prediction. The apparatus has processing circuitry for executing instructions, and branch prediction circuitry that comprises a plurality of branch prediction mechanisms used to predict target addresses for branch instructions to be executed by the processing circuitry. The branch instructions comprise a plurality of branch types, where one branch type is a return instruction. The branch prediction mechanisms include a return prediction mechanism used by default to predict a target address when a return instruction is detected by the branch prediction circuitry. However, the branch prediction circuitry is responsive to a trigger condition indicative of misprediction of the target address when using the return prediction mechanism to predict the target address for a given return instruction, to switch to using an alternative branch prediction mechanism for predicting the target address for the given return instruction. This has been found to improve performance in certain situations.

18 Claims, 10 Drawing Sheets

(51) Int. Cl.
*G06F 21/52* (2013.01)
*G06F 9/38* (2018.01)
*G06F 9/30* (2018.01)
*G06F 9/46* (2006.01)

(52) U.S. Cl.
CPC .......... *G06F 9/3848* (2013.01); *G06F 9/3806* (2013.01); *G06F 9/46* (2013.01); *G06F 21/52* (2013.01)

(58) Field of Classification Search
USPC ......... 712/237–240; 711/133, 136, 159, 160, 711/132; 726/23, 27–30
See application file for complete search history.

(56) References Cited

U.S. PATENT DOCUMENTS

| | | | |
|---|---|---|---|
| 7,552,314 B2 * | 6/2009 | Gelman | G06F 9/3844 712/206 |
| 8,090,934 B2 * | 1/2012 | Koc | G06F 9/3806 712/238 |
| 2002/0194463 A1 | 12/2002 | Henry et al. | |
| 2004/0230779 A1 * | 11/2004 | Haghighat | G06F 9/30054 712/234 |
| 2007/0083741 A1 | 4/2007 | Henry et al. | |
| 2009/0063831 A1 * | 3/2009 | Ekman | G06F 9/3804 712/239 |
| 2009/0287912 A1 | 11/2009 | Sendag | |
| 2011/0238966 A1 * | 9/2011 | Takebe | G06F 9/3806 712/239 |
| 2017/0024559 A1 * | 1/2017 | Hughes | G06F 21/54 |

OTHER PUBLICATIONS

International Search Report and Written Opinion of the International Searching Authority for PCT/GB2019/050417 dated May 17, 2019, 18 pages.

* cited by examiner

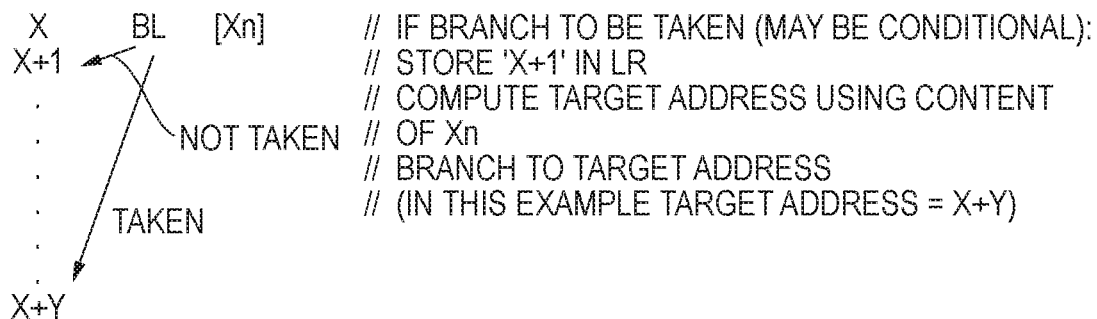

FIG. 8A

RETPOLINE SOFTWARE CONSTRUCT

INDIRECT BRANCH

| | | |
|---|---|---|
| BR Xn | BL SET_UP_TARGET | // LR INITIALLY SET TO CAPTURE_SPEC AND CAPTURE_SPEC PUSHED ONTO RETURN STACK. ANY SPECULATIVE PREDICTION FOR THE RETURN WILL CONSUME "CAPTURE_SPEC" FROM RETURN STACK |
| | CAPTURE_SPEC | |
| | B CAPTURE_SPEC | |
| | SET_UP_TARGET | |
| | MOV X30, Xn | // UPDATES LR TO CORRECT TARGET ADDRESS |
| | RET | // RETURNS TO CORRECT TARGET ADDRESS FOR BRANCH (IF SPECULATIVE BRANCH PREDICTION HAS OCCURRED, WILL BE NOTED THAT BRANCH WAS MISPREDICTED) |

FIG. 8B

APPARATUS AND METHOD FOR CONTROLLING BRANCH PREDICTION

BACKGROUND

The present technique relates to an apparatus and method for controlling branch prediction.

A data processing apparatus may have branch prediction circuitry for predicting outcomes of branch instructions before they are actually executed. By predicting branch outcomes before the branch instruction is actually executed, subsequent instructions following the branch can start to be fetched and speculatively executed before execution of the branch instruction is complete, so that if the prediction is correct then performance is saved because the subsequent instructions can be executed sooner than if they were only fetched once the outcome of the branch is actually known.

In order to obtain optimum performance benefits form the use of branch prediction, it is desirable that the predictions made by the branch prediction circuitry are as accurate as possible, so as to reduce the number of mispredictions that arise when using the branch prediction circuitry.

SUMMARY

In one example configuration, there is provided an apparatus comprising: processing circuitry to execute instructions; and branch prediction circuitry comprising a plurality of branch prediction mechanisms used to predict target addresses for branch instructions to be executed by the processing circuitry, the branch instructions comprising a plurality of branch types, where one branch type is a return instruction; wherein the branch prediction mechanisms include a return prediction mechanism used by default to predict a target address when a return instruction is detected by the branch prediction circuitry; the branch prediction circuitry being responsive to a trigger condition indicative of misprediction of the target address when using the return prediction mechanism to predict the target address for a given return instruction, to switch to using an alternative branch prediction mechanism for predicting the target address for the given return instruction.

In another example configuration there is provided, a method of controlling branch prediction in an apparatus having processing circuitry to execute instructions, the method comprising: providing branch prediction circuitry comprising a plurality of branch prediction mechanisms used to predict target addresses for branch instructions to be executed by the processing circuitry, the branch instructions comprising a plurality of branch types, where one branch type is a return instruction; using by default a return prediction mechanism amongst the plurality of branch prediction mechanisms to predict a target address when a return instruction is detected by the branch prediction circuitry; and responsive to a trigger condition indicative of misprediction of the target address when using the return prediction mechanism to predict the target address for a given return instruction, switching to using an alternative branch prediction mechanism amongst the plurality of branch prediction mechanisms for predicting the target address for the given return instruction.

In yet a further example configuration, there is provided an apparatus comprising: processing means for executing instructions; and branch prediction means comprising a plurality of branch prediction mechanisms for use when predicting target addresses for branch instructions to be executed by the processing means, the branch instructions comprising a plurality of branch types, where one branch type is a return instruction; wherein the branch prediction mechanisms include a return prediction mechanism used by default to predict a target address when a return instruction is detected by the branch prediction means; the branch prediction means, responsive to a trigger condition indicative of misprediction of the target address when using the return prediction mechanism to predict the target address for a given return instruction, for switching to using an alternative branch prediction mechanism for predicting the target address for the given return instruction.

BRIEF DESCRIPTION OF THE DRAWINGS

The present technique will be described further, by way of illustration only, with reference to examples thereof as illustrated in the accompanying drawings, in which:

FIG. 8A schematically illustrates the operation of a branch with link instruction;

FIG. 8B illustrates a software construct that can be used to isolate indirect branch instructions from speculative execution;

DESCRIPTION OF EXAMPLES

Figure 1:
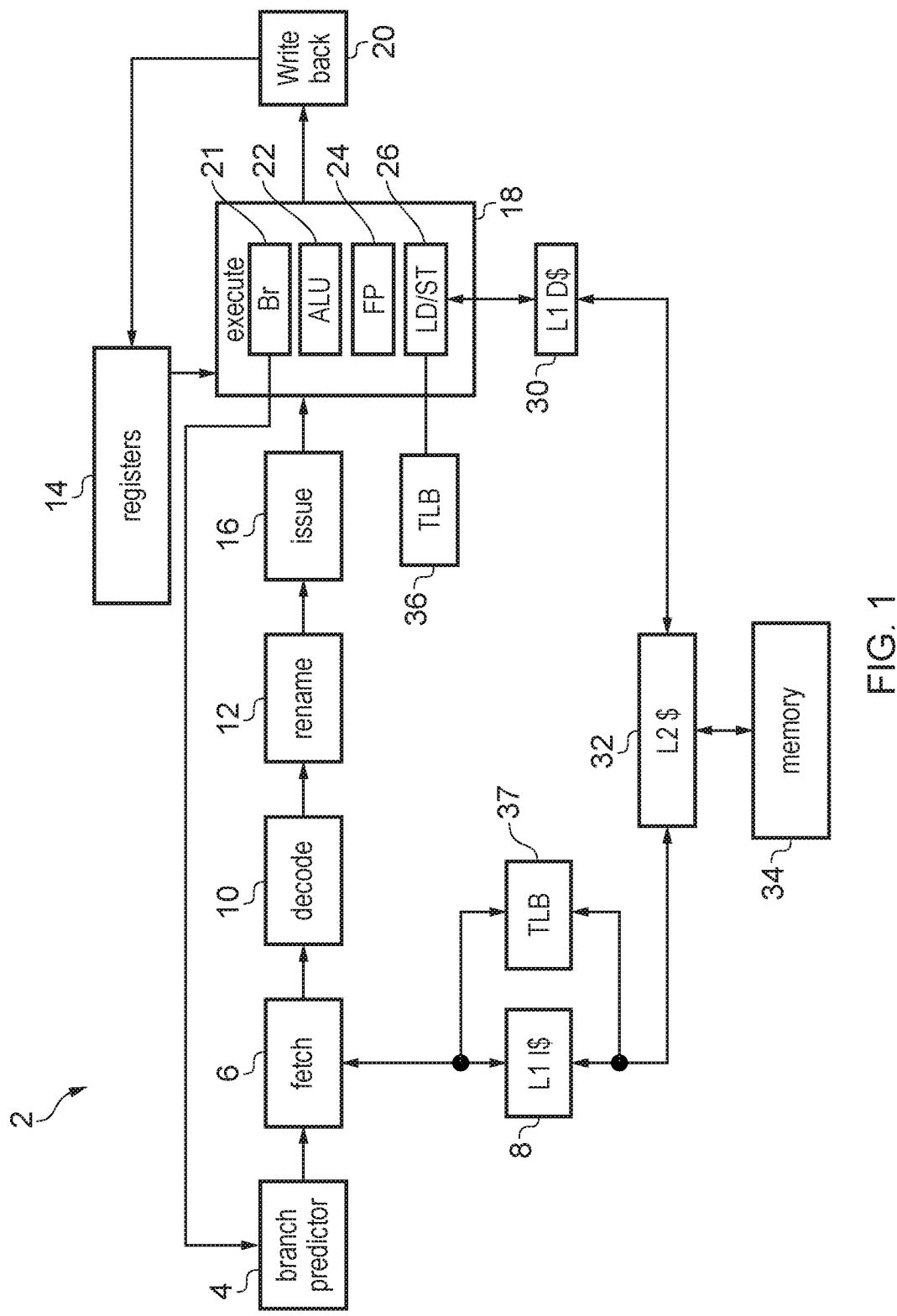
FIG. 1 schematically illustrates an example of a data processing apparatus having a branch predictor.

In one example, an apparatus is provided that has processing circuitry for executing instructions, and branch prediction circuitry for predicting target addresses for branch instructions to be executed by the processing circuitry. The branch prediction circuitry comprises a plurality of branch prediction mechanisms that can be used to predict target addresses for the branch instructions. The branch instructions may comprise a plurality of branch types, and the branch prediction mechanism used in any particular instance may depend on the type of branch instruction for which the target address is to be predicted.

One type of branch instruction is a return instruction. When a call is made to a function in the software code, this may be performed via a branch with link instruction. When the branch with link instruction is executed, a return address is stored, for example within a link register, this typically being the address of the instruction following the branch with link instruction. The function is then executed, and at the end of the function a return instruction is executed. For the return instruction, the target address is the return address that was determined when the associated branch with link instruction was executed.

Hence, the return instruction is a particular type of branch instruction that uses as its target address the return address previously set up when the associated branch with link instruction is executed. Within the branch prediction circuitry, a return prediction mechanism can be used to predict a target address when a return instruction is detected by the branch prediction circuitry. Typically, this return prediction mechanism is highly accurate, since the contents of the return prediction mechanism can be populated for each return instruction when a prediction is made in respect of an associated branch with link instruction.

However, it has been realised that in certain instances the return prediction mechanism may be unable to provide an accurate target address for a return instruction, resulting in misprediction.

As a particular example, Google have recently published information about speculation-based cache timing side-channel attacks, where a number of techniques can be used so that cache timing analysis can be abused to leak information out of mis-speculated execution of instructions. The basic principle behind cache timing side-channels is that the pattern of allocations into the cache, and in particular which cache sets have been used for allocation, can be determined by measuring the time taken to access entries that were previously in the cache, or by measuring the time to access the entries that have been allocated. This can then be used to determine which addresses have been allocated into the cache. The novelty of speculation-based cache timing side-channels is their use of speculative memory reads. Speculative memory reads are typical of advanced microprocessors, and part of the overall functionality which enables high performance.

By performing a first speculative memory read to a cacheable location beyond an architecturally unresolved branch (or other change in program flow), the result of that read can itself be used to form the addresses of further speculative memory reads. These speculative reads cause allocations of entries into the cache whose addresses are indicative of the values of the first speculative read. This can become an exploitable side-channel if untrusted code is able to control the speculation in such a way that it causes a first speculative read of a location which would not otherwise be accessible by that untrusted code. In particular, the effects of the second and subsequent speculative allocations into the cache can be measured by the untrusted code.

One mechanism that can be used to seek to perform such an attack is referred to as a branch target injection variant of the attack. Such an attack makes use of the branch prediction circuitry, and in particular seeks to train a particular branch prediction mechanism using the untrusted code, so as to influence the branch predictions made by trusted code. In particular, a branch prediction mechanism may use the history of previous branches to speculate the change of an instruction stream. The resulting speculation can take a considerable time to be resolved. This delay in resolution can result in the process of performing speculative memory accesses, thus causing allocation into the caches. In some implementations, the history of previous branches used to drive the speculation is not filtered by the exception level that the processor was in, and accordingly it is possible for the code running at one exception level to train the branch predictor in a manner that causes other exception levels (or other contexts) to perform speculative memory accesses. This can then be used to stimulate the speculation-based cache timing side-channel attack by having a lower exception level train the branch predictor to influence the speculative instruction stream of a higher exception level, or in a different context, to read data otherwise inaccessible at the lower exception level, and additionally to allocate items speculatively into the caches based on that data. Code running at the lower exception level can then examine the impact of cache allocation, so exploiting the cache timing side-channel.

Google have recently proposed a software construct called a "Retpoline" sequence that can be used to mitigate against branch target injection techniques. In particular, the software construct can be used to cause branch mispredictions when executing indirect branch instructions, by causing mispredicted target addresses to be obtained from the return prediction mechanism rather than via an intended branch prediction mechanism, hence protecting against situations where the intended branch prediction mechanism is vulnerable to being utilised to implement a branch target injection attack. Thus, by using the software construct, the intended branch prediction mechanism for the indirect branch instructions can be bypassed, and instead the software construct causes target addresses to be obtained from the return prediction mechanism. Due to the way this software construct is arranged, the target address obtained from the branch prediction mechanism is not the intended target address, but instead is an address that serves to capture speculative execution in a state where no useful process is performed, hence serving to isolate indirect branch instructions from speculative execution.

Whilst this can protect against the branch target injection attack, it has a significant impact on performance, due to the enforced branch mispredictions that occur.

However, it has been realised that in the future techniques will be developed that enable the branch prediction mechanisms themselves to be robust to such branch target injection attacks. Nevertheless, at that point, there is likely to be legacy code using "Retpoline" sequences that have a significant impact on performance, but are no longer needed to address the branch target injection attack vulnerability.

In order to address this potential issue, then in accordance with the techniques described herein the branch prediction circuitry uses the return prediction mechanism by default to predict a target address when a return instruction is detected by the branch prediction circuitry. However, the branch prediction circuitry is responsive to a trigger condition indicative of misprediction of the target address when using the return prediction mechanism to predict the target address for a given return instruction, to switch to using an alternative branch prediction mechanism for predicting the target address. Hence, whilst one would normally expect the return prediction mechanism to be highly accurate in predicting target addresses, when a condition is detected where the return prediction mechanism is not accurately predicting target addresses, the branch prediction circuitry is able to switch to using an alternative branch prediction mechanism for predicting the target address for the given return instruction. Depending on the implementation, the alternative branch prediction mechanism may be used for the current instance of the given branch instruction, and/or for at least one subsequent instance of the given branch instruction.

Hence, in accordance with the earlier example where a "Retpoline" software sequence is used to mitigate against branch target injection attacks, once the branch prediction circuitry is such that the intended branch prediction mechanism to be used for indirect branch instructions is configured to be robust against the branch target injection attack, the use of the trigger condition enables the mispredictions caused by the "Retpoline" software construct to be detected, and for subsequent predictions to be made using the intended branch prediction mechanism. As a result, this restores performance, and in particular avoids the performance impact that would otherwise arise from use of the software construct.

However, the use of the above described software construct is not the only reason why the return prediction mechanism may give rise to mispredictions of the target address. For example, it is possible that the code being executed by the processing circuitry comprises multiple nested code portions, which may each be defined by branch with link instructions, and their associated return instructions. The presence of the multiple nested code portions may be sufficient to cause an overflow condition in the return prediction mechanism where at least one target address for a particular older pending return instruction is overwritten with a target address for a later pending return instruction. Due to the nesting effect, older pending return instructions will not actually be executed until after later pending return instructions. Hence, the predictions for the later pending return instructions get consumed earlier than the predictions for the older pending return instructions. As a result, when a prediction of the target address is to be made for the particular older pending return instruction whose target address has been overwritten, there will be an absence of a relevant entry within the return prediction mechanism, and this can be used to cause the trigger condition to be detected, such that the alternative branch prediction mechanism is used to predict the target address.

Hence, it will be appreciated that there are a number of different scenarios where mispredictions may be detected in the return prediction mechanism, and the use of the above described technique enables the branch prediction circuitry to switch to using an alternative branch prediction mechanism in such situations.

There are a number of ways in which the trigger condition can be detected for particular return instructions. In one example arrangement, the branch prediction circuitry is arranged to maintain prediction control information for one or more return instructions, for each return instruction the prediction control information identifying whether the trigger condition is present or absent, thereby controlling for each return instruction whether the target address for that return instruction is predicted using the return prediction mechanism or using the alternative branch prediction mechanism. Hence, in such an arrangement, presence or absence of the trigger condition can be detected for individual return instructions.

In one example arrangement, when the processing circuitry executes the given return instruction, the processing circuitry is arranged to determine whether the target address determined by the branch prediction circuitry was correct, and to provide to the branch prediction circuitry feedback information indicative of whether the target address determined by the branch prediction circuitry was correct, the branch prediction circuitry being arranged to use the feedback information to maintain the prediction control information. Hence, the prediction control information can be updated based on information received when the relevant return instructions are accurately executed, enabling an assessment as to how accurate the predictions being made by the return prediction mechanism are.

The prediction control information can take a variety of forms, but in one arrangement comprises a confidence indication indicating, for the associated return instruction, a level of misprediction observed when using the return prediction mechanism to predict the target address for that associated return instruction. In such cases, the trigger condition may be considered to exist when the level of misprediction indicated by the confidence indication reaches a chosen level of misprediction. By such an approach, the level of misprediction required to trigger switch to use of the alternative branch prediction mechanism can be tailored to the particular implementation.

In one example, the chosen level of misprediction may comprise a single instance of misprediction being confirmed by the processing circuitry for the associated return instruction, such that following the single instance of misprediction, the confidence indication causes the branch prediction circuitry to use the alternative branch prediction mechanism for predicting the target address for at least one subsequent instance of that associated return instruction. Hence, in such an arrangement, as soon as there is a single instance of misprediction in respect of a given return instruction, the alternative branch prediction mechanism may then be used for predicting the target address for one or more subsequent instances of that return instruction. As mentioned earlier, the return prediction mechanism is typically expected to be highly accurate, and indeed in many implementations it will not be expected that a misprediction should arise. Hence, even a single misprediction may be sufficient to indicate presence of the trigger condition in such an arrangement, and hence cause the switch to use of the alternative branch prediction mechanism.

However, the chosen level of misprediction can be configured such that more than one instance of misprediction is required before the trigger condition is detected, if desired. In particular, in one example arrangement the chosen level of misprediction may comprise a determined plurality of instances of misprediction being confirmed by the processing circuitry for the associated return instruction, for each instance of misprediction the branch prediction circuitry being arranged to adjust a value of the confidence indication. As a result, following the determined plurality of instances of misprediction, the confidence indication has a value indicating the trigger condition so as to cause the branch prediction circuitry to use the alternative branch prediction mechanism for predicting the target address for at least one subsequent instance of that associated return instruction.

The manner in which the confidence indication is adjusted will vary dependent on implementation. However, in one example arrangement, the confidence indication is initialized to an initial value, and the branch prediction circuitry is arranged to increment the confidence indication in response to each instance of misprediction.

In one example arrangement, the confidence indication value may be arranged so that it can only increase, and hence each instance of misprediction will cause the value to be incremented, such that at some point, once a sufficient number of mispredictions have been detected, the trigger condition will be detected. However, in an alternative arrangement, an equivalent decrementing mechanism may also be employed if desired. For example, whilst the confidence indication is greater than the initial value, the branch prediction circuitry may be arranged to decrement the confidence indication in response to each instance of correct prediction.

Hence, through such a mechanism, following the trigger condition being determined to exist, it is possible that it may subsequently be assessed that the return prediction mechanism is able to make correct predictions again, causing the confidence indication to be decremented to the point where the trigger condition no longer exists, and the branch prediction circuitry switches back to using the return prediction mechanism. It should be noted that in order to keep the return prediction mechanism synchronised in terms of the number of branch with link instructions and associated number of return instructions, it is still appropriate to remove an entry from the return prediction mechanism even when another prediction mechanism is used to predict the target address for the return instruction, either at the time the prediction is made, or at the time feedback is sent to the branch prediction circuitry following execution of the return instruction. Accordingly, the target address that would have been predicted had the return prediction mechanism been used can be referenced at the time the feedback information is provided to determine whether the return prediction mechanism would have correctly predicted the target address, and if so the confidence counter can then be decremented.

In one example arrangement, one of the plurality of branch prediction mechanisms provided by the branch prediction circuitry may comprise a branch target buffer (BTB) having a plurality of entries, each entry maintaining a memory address indication and a branch type indication to identify the branch type for a branch instruction predicted in association with the memory address indication, wherein the branch type indication is used by default to determine the branch prediction mechanism used to predict target addresses for the branch instruction predicted by that entry. Hence, when a hit is detected within one of the entries of the branch target buffer, the information stored therein can be used to determine which branch prediction mechanism is used to predict the target address. This might for example be the branch target buffer itself, but could be any one of the other branch prediction mechanisms.

For example, if a hit occurs within an entry of the branch target buffer, and the branch type indication indicates that the branch instruction is a return instruction, then by default the return prediction mechanism will be used to determine the predicted target address. However, in the presence of the trigger condition, the alternative branch prediction mechanism will be used. Hence, for return instructions, the branch type indication in the hit entry of the branch target buffer is used in combination with the prediction control information to identify the appropriate branch prediction mechanism to use to predict the target address.

The prediction control information can be maintained in a variety of ways, but in one example arrangement with branch target buffer is arranged to maintain the prediction control information in each entry for which the predicted branch type is a return instruction.

In one example arrangement, the prediction control information is encoded with the branch type indication such that in the absence of the trigger condition the branch type indication identifies that the return prediction mechanism is to be used to predict the target address for the associated return instruction, and in the presence of the trigger condition the branch type indication identifies that the alternative branch prediction mechanism is to be used to predict the target address for the associated return instruction. In particular, in one example arrangement, the number of bits provided for the branch type indication field is sufficient that there are some bits that would otherwise be unused in the BTB entry for return instructions, and those unused bits can be used to encode the prediction control information.

In one example arrangement, each entry in the branch target buffer comprises a target address field to indicate a target address when a branch instruction is predicted in association with the memory address indication, and the branch target buffer comprises the alternative branch prediction mechanism. Hence, in the event that a hit is detected within an entry of the branch target buffer for a return instruction, and the prediction control information indicates that the alternative branch prediction mechanism should be used, the target address is obtained directly from the hit entry of the branch target buffer.

However, in some instances it may be appropriate for the alternative branch prediction mechanism to be something other than the branch target buffer. For example, in one arrangement, the alternative branch target prediction mechanism may be a multi-target branch target prediction mechanism used to predict target addresses of branch instructions which are polymorphic, that is their branch target address varies from time to time so that different instances of execution of the branch instructions at the same instruction fetch address may result in different target addresses depending on the outcome of previous instructions preceding the branch. The multi-target branch target prediction mechanism is a type of branch target prediction mechanism that seeks to make accurate predictions for branch instructions which are polymorphic.

As mentioned earlier, one example use case where the above described techniques can be useful is when the processing circuitry is arranged to execute software employing a software construct to cause branch mispredictions when executing indirect branch instructions, by causing mispredicted target addresses to be obtained from the return prediction mechanism rather than via an intended branch prediction mechanism in situations where the intended branch prediction mechanism is vulnerable to being utilised to implement a branch target injection attack. However, once this vulnerability in the intended branch prediction mechanism has been addressed, and hence the apparatus on which the software is running has a form of the intended branch prediction mechanism that is robust against the branch target injection attack, the performance issues caused by the software construct are no longer a price that needs to be paid to ensure security against the attack. However, in accordance with the above described techniques, the alternative branch prediction mechanism used in the presence of the trigger condition can be set to be the intended branch prediction mechanism for the indirect branch instructions, and hence the use of the trigger condition enables the mispredictions caused by the software construct to be detected, and for subsequent predictions to be made using the intended branch prediction mechanism, hence restoring performance.

Whilst the earlier described confidence indication mechanism can be used to detect the mispredictions, in one particular arrangement, where the above described software construct is used, the processing circuitry may comprise detection circuitry to detect use of the software construct, and to indicate the detection to the branch prediction circuitry for use by the branch prediction circuitry in detecting presence of the trigger condition. This can enable a quicker determination of the trigger condition, hence further improving performance.

As mentioned earlier, the above described techniques can also be used in other situations where a misprediction using the return prediction mechanism may occur, for example when the processing circuitry is executing software comprising multiple nested code portions, and the multiple nested code portions are sufficient to cause an overflow condition in the return prediction mechanism. At some point, this will result in the absence of a relevant entry within the return prediction mechanism for a particular return instruction, hence meaning the return prediction mechanism cannot provide a prediction for that particular return instruction, which is then treated as a misprediction that causes the trigger condition to be detected.

The return prediction mechanism can take a variety of forms, but in one embodiment is a return stack. When the branch prediction circuitry predicts a target address for a function call, for example when a branch with link instruction is encountered, it can calculate the return address that will be used by the associated return instruction and push that return address onto the return stack. Subsequently, when a prediction is to be made for the associated return instruction, an entry can be popped from the return stack to identify the target address to be predicted.

Particular examples will now be described with reference to the Figures.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 and the fetch unit 6 may use a translation lookaside buffer 37 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

Figure 2:
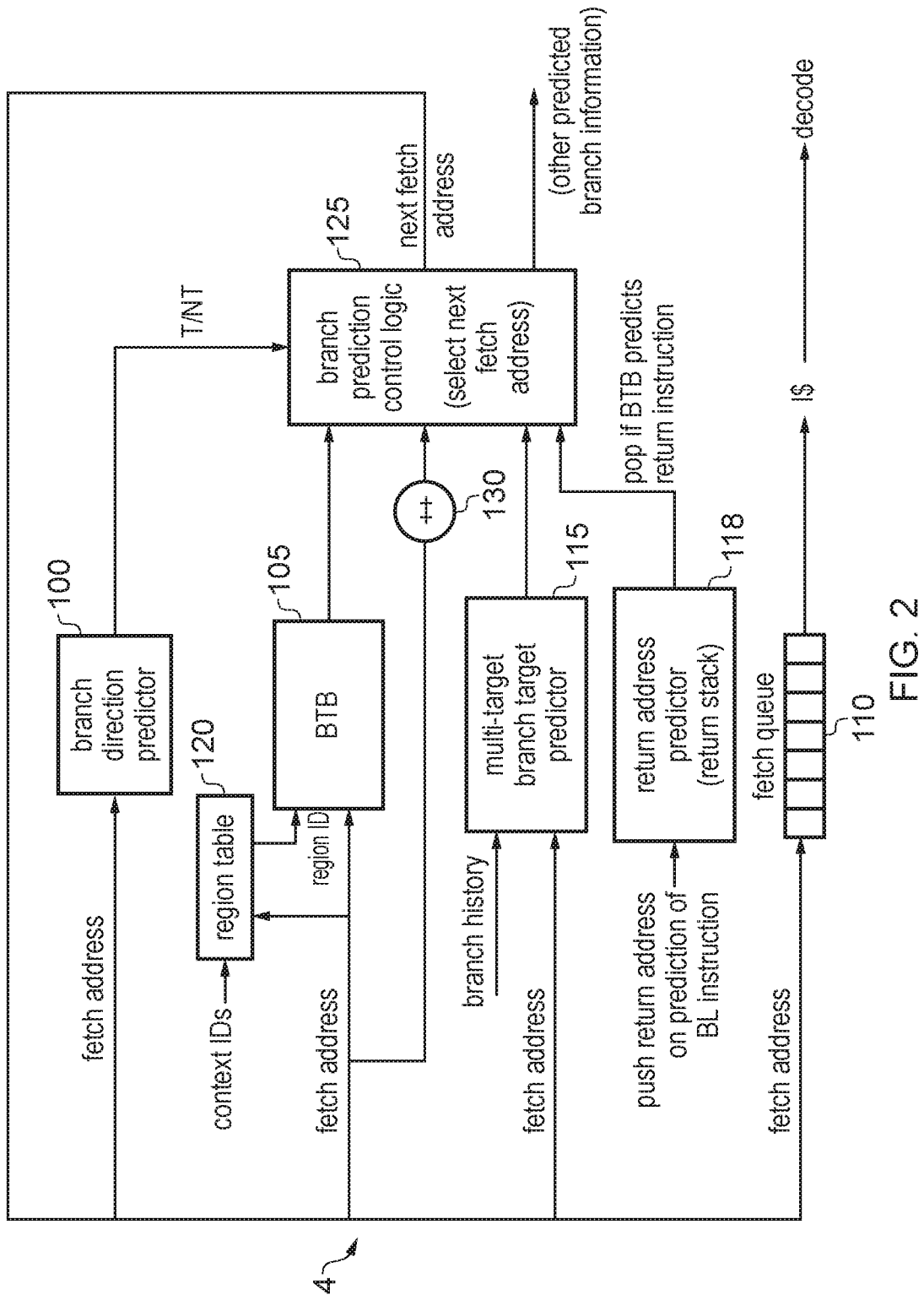
FIG. 2 is a block diagram illustrating in more detail components that may be provided within the branch predictor of FIG. 1 in one example arrangement.

FIG. 2 is a block diagram illustrating components that may be provided within the branch predictor 4 of FIG. 1 in accordance with one example arrangement. The branch prediction circuitry includes a branch direction predictor (BDP) 100 for predicting whether branch instructions are taken or not taken, and a branch target buffer (BTB) 105 for predicting the target address to which a branch instruction will redirect program execution in the event that it is taken. However, the BTB is just one of the branch prediction mechanisms for predicting a target address, and further branch prediction mechanisms such as the multi-target branch target predictor 115 and the return address predictor 118 may also be provided, as will be discussed in more detail later.

A fetch queue 110 is provided for queuing the fetch addresses identifying blocks of program instructions to be fetched from the instruction cache 8 (note that in some cases the fetch queue could be regarded as part of the fetch stage 6 instead of part of the branch predictor 4, but the functionality would be the same). The addresses placed in the fetch queue 110 represent addresses of blocks of instructions to be fetched from the instruction cache 8, which are derived from previous predictions of the branch predictor. The unit of instructions fetched in one block from the cache 8 may be referred to as a "fetch block" and may have a certain default size, e.g. 16, 32 or 64 bytes, although in some cases when the start address from which fetching is to be performed is not aligned with a natural fetch block boundary, a fetch of a partial fetch block may be performed with a size less than the default size.

The BDP 100, which can also be referred to as a branch history buffer or branch outcome predictor, records branch history information for predicting the taken/not taken outcome of branch instructions. Any known branch taken/not taken prediction scheme may be used for the BDP 100. For example, gshare or TAGE are examples of known branch direction prediction algorithms.

Figure 3:
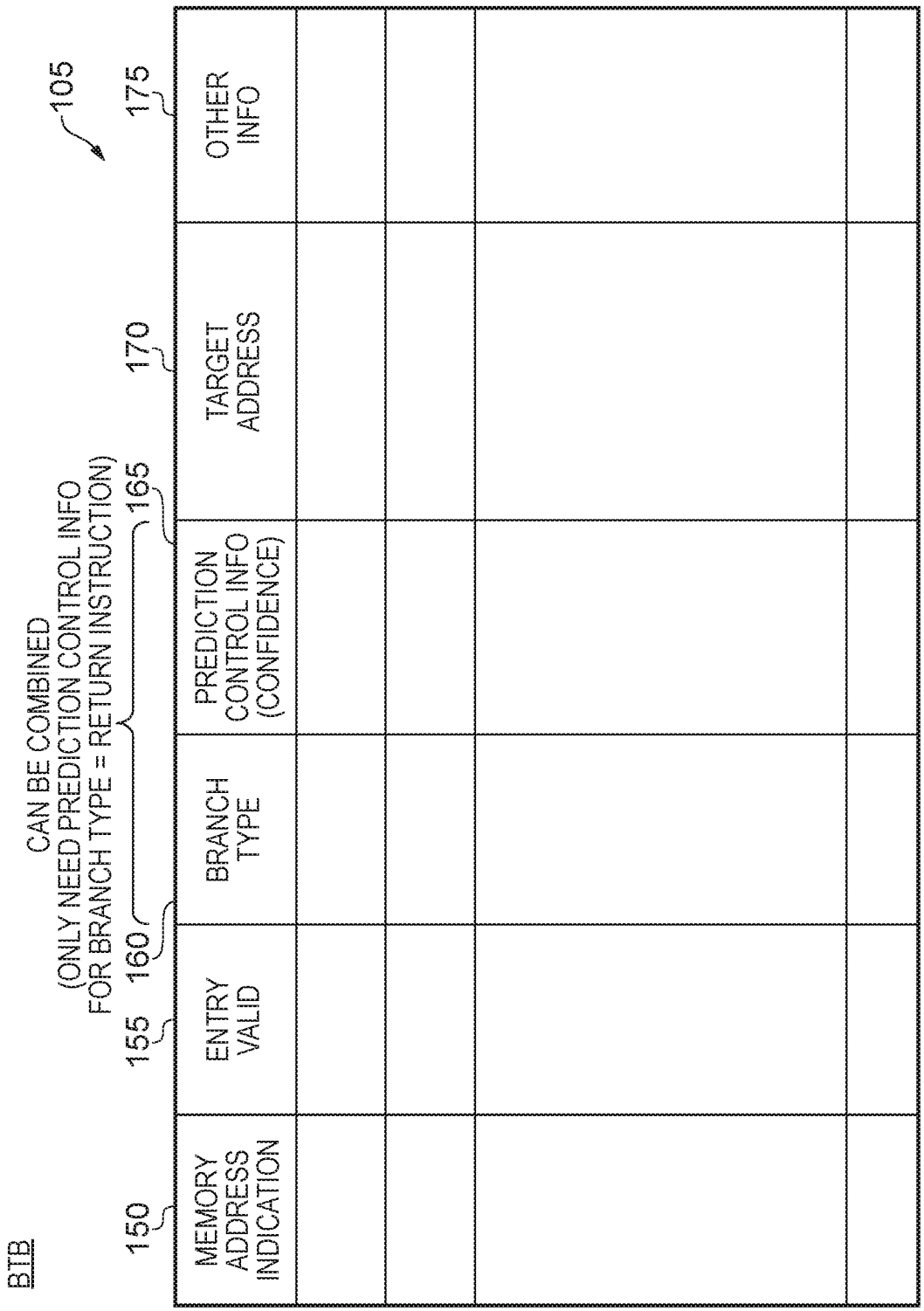
FIG. 3 is a diagram schematically illustrating fields that may be provided within each entry of the branch target buffer (BTB) of FIG. 2 in one example arrangement.

The BTB 105 holds prediction information for a number of branch instructions, and may comprise a plurality of entries as illustrated schematically in FIG. 3. As shown in FIG. 3, each entry may include a number of fields. In particular, a field 150 can be provided to indicate a memory address indication for the entry, which may for example provide a tag corresponding to a portion of the instruction address for the branch instruction (and which may possibly be dependent on other information such as context identifiers or other identifiers of the current execution environment). A valid field 155 can be set to identify that the entry is valid, and a field 160 can be used to identify the type of branch instruction predicted to exist in association with the memory address indication 150. For example, the branch type information may identify whether the branch is a direct branch, an indirect branch, a function call (e.g. branch with link instruction), a function return (e.g. a return instruction), etc. The branch type information is used to identify which of the various branch prediction mechanisms 105, 115, 118 are to be used to predict the target address for the branch instruction, i.e. it identifies which mechanism is to be used to identify the target address on the assumption that the branch is taken. For instance, for some branch instructions, they may be conditional, and hence whether the branch is taken or not will depend on assessment of those conditions, with the BDP 100 being used to make a prediction as to whether the branch is taken or not taken. However, other types of branch instruction may be unconditionally executed. For example, it is typically the case that a return instruction will always be executed and the branch taken, and hence a prediction of the target address is used for all such occurrences of a return instruction.

For some types of branch instruction, the target address may be specified by the BTB entry, and hence a target address field 170 is provided for providing that target address information. A further field 175 is provided for capturing other information, such as the instruction address (program counter or PC) of the corresponding branch instruction, some attributes concerning the branch, such as whether it is unconditional, etc.

Of particular interest to the present disclosure is how return instructions are processed, and in particular how predictions are made of the target address for such return instructions. By default, the return address predictor 118 is used to predict the target address, and hence if a hit occurs within the BTB 105 for a provided fetch address, and that entry indicates that the branch type is a return instruction, an entry will be retrieved from the return address predictor 118 to be used as the predicted return address.

The return address predictor can take a variety of forms, but in one example is a return stack 118. Hence, in accordance with such a form of return address predictor, when a prediction is made in respect of a function call (for example a branch with link instruction), then the return address is calculated. In particular, it is typically the case that the return address will be the address of the immediately following instruction after the branch with link instruction. That return address is then pushed onto the return stack 118, since it is that address that will subsequently be used as the predicted target address for the associated return instruction when that return instruction is encountered during the prediction process. Hence, when a prediction is required for the associated return instruction, an entry is popped from the return stack 118 and forwarded to the branch prediction control logic 125.

The branch predictor 4 may also include a multi-target branch target predictor 115, which is a special kind of branch target buffer used for predicting the target addresses of branch instructions which are polymorphic, that is their branch target address varies from time to time so that different instances of execution of the branch instructions at the same instruction fetch address may result in different target addresses depending on the outcome of previous instructions preceding the branch. Branch history information may be input to the multi-target branch target predictor for use in determining target addresses for such polymorphic branch instructions.

As also shown in FIG. 2, the branch predictor 4 may comprise a region table 120 which is used to compress context identifiers into a shorter region identifier that may be used as tag information for the BTB 105.

When the fetch stage 6 starts a new fetch for a given fetch address to fetch a block of instructions from the instruction cache 8, the branch predictor 4 also looks up that fetch address in the BDP 100, the BTB 105, and the multi-target branch target predictor 115. When the BTB 105 holds predicted branch information for the program counter address represented by the current fetch address, then that information is read out from the BTB 105 and is qualified by the BDP 100. The lookup may be controlled by branch prediction control logic 125. When the branch is predicted not taken by the BDP 100, the branch prediction control logic 125 selects as the next fetch address an incremented version of the current fetch address, incremented by a certain stride amount by an adder 130, so that the next fetch address used in a following cycle will follow on sequentially from the current fetch address. On the other hand, if the BDP 100 predicts that the branch is taken, the branch prediction control logic 125 selects as the next fetch address a target address determined from one of the branch target prediction mechanisms 105, 115, 118. In particular, if the branch instruction is of a type of branch where the target address is provided by the BTB, then the target address output by the BTB is used. Conversely, if the hit entry in the BTB indicates that the branch has previously been detected as being polymorphic, the branch prediction control logic 125 is used to select the branch target address output by the multi-target branch target predictor 115 as the next fetch address instead of the output of the BTB 105. The multi-target branch target predictor bases its predicted target address on the branch history of earlier branches preceding the current point of execution identified by the current instruction fetch address, in contrast to the prediction made by the BTB 105 which is independent of the branch history.

As another example, if the hit entry in the BTB indicates that the branch instruction is a return instruction, then by default an entry may be popped from the return stack, and the branch prediction control logic 125 will use that target address as the next fetch address.

The next fetch address output by the branch prediction control logic 125 is allocated to the fetch queue 110 so that in due course when that address reaches the front of the queue the corresponding block of instructions is fetched from the instruction cache by the fetch stage 6. Also the next fetch address is input as the current fetch address in a following processing cycle to trigger another lookup of the branch predictor 4 for that fetch address. This process continues cycle by cycle in order to step through the program code being executed. If a branch misprediction is detected at the branch unit 21 of FIG. 1, when the actual outcome of a branch instruction is different to the predicted outcome generated by the branch predictor 4, then signals are sent back to the fetch stage 6 to reset the fetch queue and resume fetching from the actual branch target address, and to update contents of the various prediction structures 100, 105, 115, 118 based on the actual outcome of the branch to increase the likelihood of predictions being correct in future.

In summary, the BTB 105 (which can also be known as a branch target address cache or BTAC) is a component of the branch predictor 4 which is a primary mechanism used to identify a predicted target address of a branch, either by directly identifying the target address, or identifying which other branch prediction mechanism 115, 118 should be used to identify the predicted target address. Hence, the BTB may effectively be a small cache of entries with each entry providing information about the branch location, the type of branch predicted at that location, and certain other attributes, such as the target address in the target address field 170. As different execution contexts (e.g. different processes being executed by the processor 2 or different virtual machines) may use the same virtual address to refer to different branches, then one way to avoid unnecessary address conflicts is to tag each BTB entry with context information, such as a process identifier and/or a virtual machine identifier.

The cache provided for the BTB can be implemented in different ways. In some examples the cache could be fully associative, so that the branch information for a given branch can be placed at any location within the BTB. However, in practice, a set associative cache implementation may be more efficient, and in this case the locations at which branch information for a given branch is allowed to be stored may be limited to a particular set (identified based on the instruction fetch address of the instruction block containing the branch) in order to reduce the number of entries which have to be looked up for a given fetch address during a branch target buffer lookup.

Typically the BTB may have a relatively larger number of entries, e.g. in the order of 1000, in order to be able to store sufficient branch information to provide high enough performance. However, in practice the number of contexts which at a given time have information stored in the BTB can be much smaller, e.g. up to 10, since one execution context could have branch information cached for many instructions of that context. Also, many of the branch instructions associated with a given context may all share the same values for a more significant portion of the branch instruction address. As a result, it is typically considered inefficient to seek to store all of the context ID information in association with each individual entry, and instead, to improve the area efficiency of the BTB, the branch predictor 4 may use a region table 120 to compress this redundant information into a shorter value. As such, the memory address indication field 150 can be arranged to store only a lower portion of the tag portion of a branch instruction address, and a region identifier which points to a corresponding region entry in the region table which specifies the context identifiers and the upper portion of the branch instruction address. The region table 120 can be much smaller than the BTB 105, e.g. having between 10 and 100 entries.

Hence, through use of the region table 120, this enables the memory address indication field of the BTB entries to be significantly reduced in size. This exploits the fact that for the purpose of looking up in the BTB 105, it is not essential to distinguish the current execution context from every other execution context, and instead all that is needed is to distinguish the current execution context from any other execution context which currently has branch information in the BTB.

However, through use of such a structure, this can lead to some false hits where the branch predictor determines that a branch from one execution context matches against branch information in a BTB entry which was allocated by a different execution context. This is one mechanism that can hence be exploited when seeking to implement the earlier-mentioned branch target injection attack, where untrusted code seeks to train the branch predictor mechanism such that it causes other code to perform speculative memory accesses. In particular, the BTB may be susceptible to such a training mechanism, which can then later open up the possibility of cache timing side channel analysis to seek to obtain information about data that the untrusted code should not have access to.

Hence it has been recognised that an attacker may be able to use the above property of the BTB to control the speculative execution of another execution context not under the control of the attacker to expose information about secret data managed by that process. This is possible if both the following conditions are satisfied:

Condition 1: Process A can use the target address provided in the BTB 105 by another process B.

Condition 2: Process B can control the target address of the BTB entry which is accessed by process A.

As will be discussed in more detail later with reference to FIG. 8B, a Retpoline software construct has been developed which can be used to effectively prevent such a compromised BTB from being used to predict the target address for indirect branch instructions, with instead predictions being made using the contents of the return stack 118. However, due to the way in which the software construct is configured, the prediction made out of the return stack is a misprediction, which will later be detected by the branch unit 21 within the execution stage 18 of the CPU pipeline. Whilst such an approach protects against the branch target injection attack, it has a significant performance impact due to the mispredictions that arise.

It has been realised that in future processors, techniques will be developed that make the BTB 105 robust against such branch target injection attacks. However, at that stage there is likely to be legacy code that still uses the Retpoline software construct approach to seek to protect against the branch target injection attack. This software construct is no longer needed given that the BTB is itself robust against the attack, and will significantly impact performance. However, as described hereafter, the present technique provides a mechanism to detect the mispredictions occurring with reference to the return stack, and in that event to switch back to using the intended branch prediction mechanism, namely in this case the BTB 105 so as to restore performance.

In particular, returning to FIG. 3, an additional field 165 is provided that can store prediction control information used to determine which branch prediction mechanism is used to provide the predicted target address in the event that the branch type stored in the branch type field 160 identifies the branch as being a return instruction. By default, the return stack 118 will be used in such instances. However, if the prediction control information is of a particular form indicating presence of a trigger condition, then this causes an alternative prediction structure to be used to identify the target address. This may for example be the BTB entry itself, using the target address in the field 170, or could be the multi-target branch target predictor 115.

The prediction control information can take a variety of forms, and can be updated in a variety of ways. However, typically the prediction control information will be updated based on information fed back from the execute stage 18 indicative of whether mispredictions have been observed or not using the target address information provided by the prediction circuitry.

Figure 4:
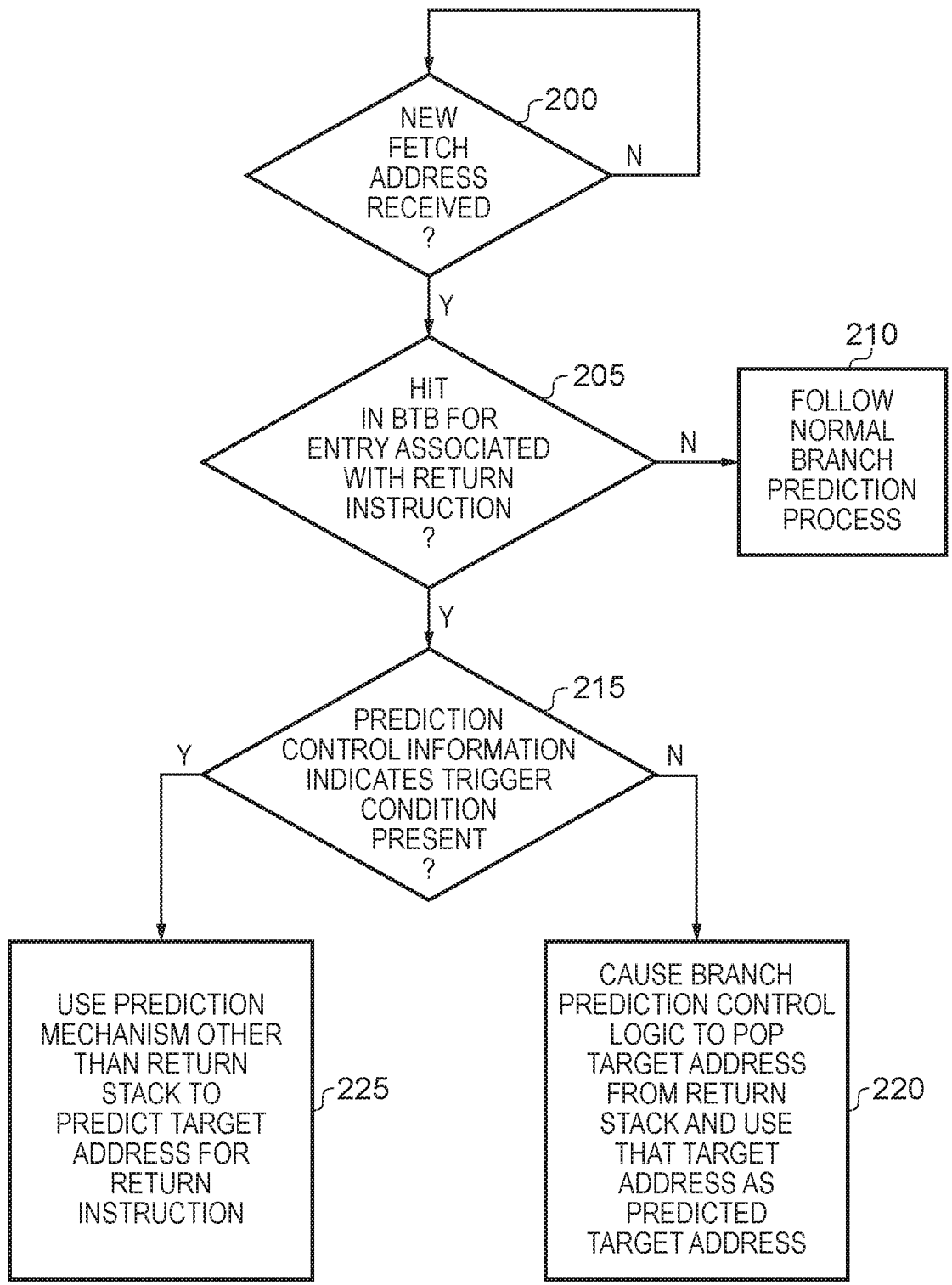
FIG. 4 is a flow diagram illustrating how the branch prediction circuitry can be used to handle predictions for return instructions in one example.

FIG. 4 is a flow diagram illustrating the handling of predictions for return instructions in accordance with one example arrangement. At step 200 it is determined whether a new fetch address has been received by the BTB 105. If so, then a lookup is performed within the BTB and it is determined at step 205 whether there is a hit within the BTB for an entry associated with a return instruction, i.e. where the branch type field 160 identifies that the branch within the hit entry is a return instruction. If not, then normal branch prediction behaviour occurs at step 210, as discussed earlier with reference to FIG. 2. Hence, whenever there is a miss within the BTB, or there is a hit for a branch instruction of a branch type other than the return instruction, then the process proceeds to step 210 where the normal behaviour of the branch prediction circuitry occurs.

However, if at step 205 a hit is detected in a BTB entry that is associated with a return instruction, then at step 215 it is determined whether the prediction control information within that entry indicates that the trigger condition is present. If the trigger condition is not present, then the process proceeds to step 220 where again the normal branch prediction behaviour occurs. In this instance the branch prediction control logic 125 will pop a target address from the return stack 118 and use that target address as the predicted target address for the return instruction.

However, if at step 215 the prediction control information indicates presence of a trigger condition, then at step 225 a prediction mechanism other than the return stack is used to predict the target address for the return instruction. In this instance, information output by the BTB can be used to identify which of the other branch prediction mechanisms are to be used for that purpose. For example, that information may identify that the target address output by the BTB itself should be used, or may identify that the output from the multi-target branch target predictor 115 should be used. It should be noted that in order to keep the return stack synchronised in terms of the number of branch with link instructions and associated number of return instructions, it is still appropriate to pop an entry from the return stack even when another prediction mechanism is used to predict the target address, either at the time of prediction, or at the time feedback is sent to the branch prediction circuitry following execution of the return instruction.

Figure 5:
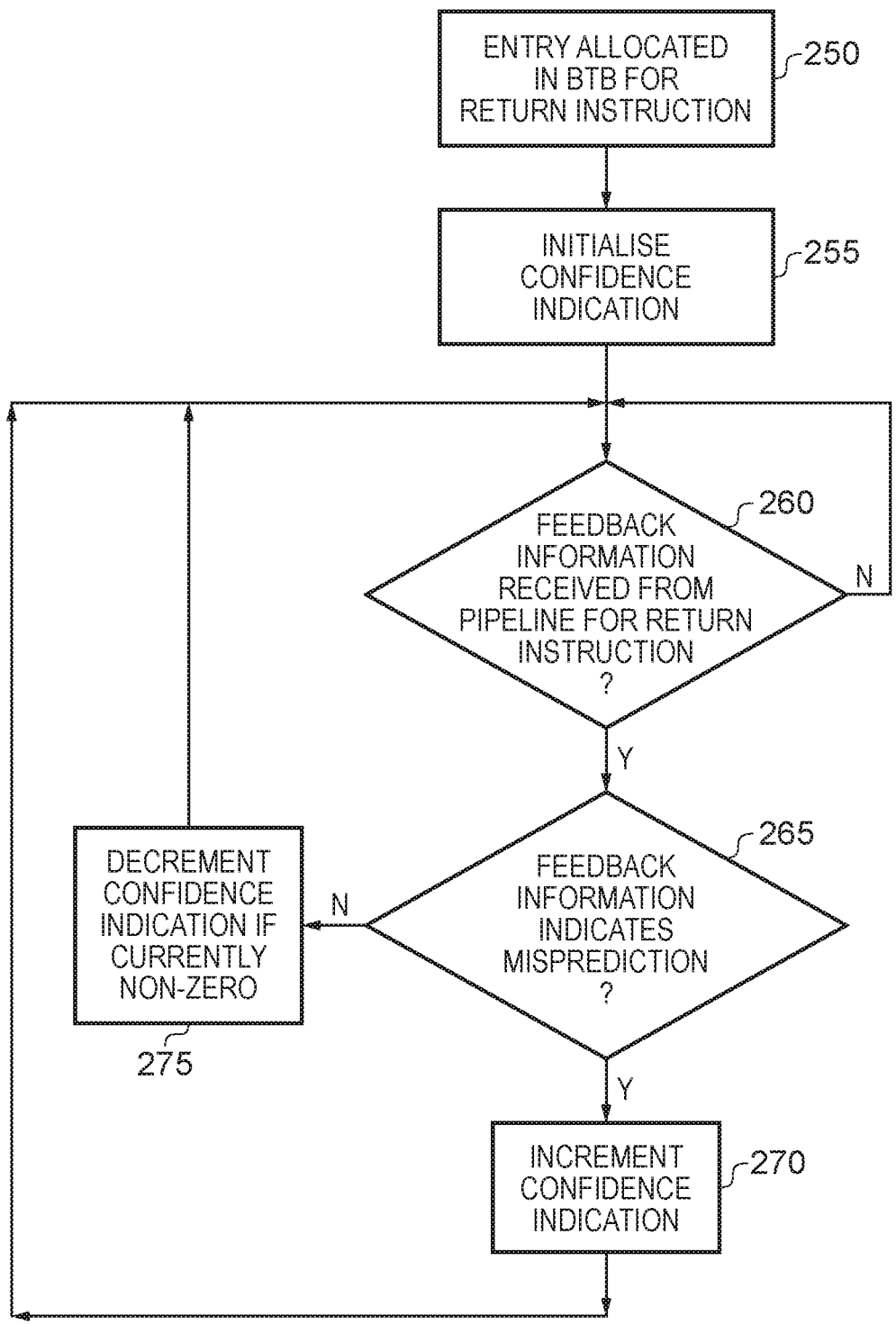
FIG. 5 is a flow diagram illustrating how the prediction control information may be updated in one example.

FIG. 5 is a flow diagram illustrating how the prediction control information can be updated in one example arrangement, in this example it being assumed that the prediction control information takes the form of a confidence indication. At step 250 it is assumed that an entry is allocated in the BTB for a return instruction, and at step 255 the confidence indication within the field 165 is then initialized, for example by being set to a 0 value. It is then assumed that a prediction is made in respect of that return instruction and at some point in the future that return instruction is then executed by the execution pipeline, resulting in the provision of feedback information at step 260 from the execution pipeline. That feedback information will for example identify whether the target address that was predicted was correct. Hence, at step 265 it can be determined from the feedback information whether a misprediction has occurred based on the target address provided by the prediction circuitry for that return instruction. If it has, then the confidence indication value is incremented at 270 and the process returns to step 260. If no misprediction has occurred, then in one arrangement the process may merely return to step 260. However, as indicated by step 275 an optional step is to decrement the confidence indication following a correct prediction, if the confidence indication is currently non-zero, i.e. is not at the initialized value set at step 255.

Figure 6:
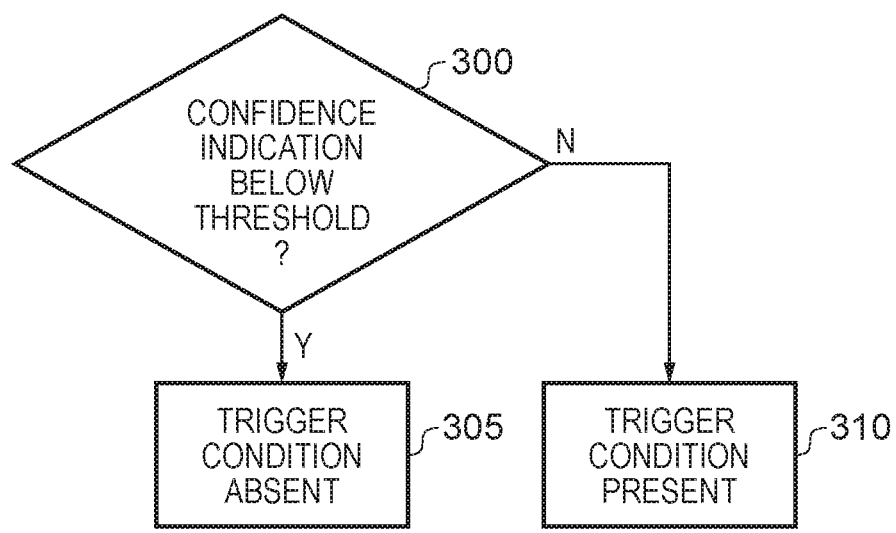
FIG. 6 is a flow diagram illustrating how the trigger condition may be detected in one example arrangement.

FIG. 6 illustrates how the trigger condition can be detected when using the approach of FIG. 5. At step 300 it is determined whether the confidence indication is below some chosen threshold value. If so, then at step 305 it is determined that the trigger condition is absent. However, if the confidence indication is not below the threshold, then at step 310 the trigger condition is determined to be present. As discussed earlier, when the trigger condition is absent, the return stack 118 will continue to be used as the prediction mechanism for predicting target addresses for return instructions. However, when the trigger condition is present an alternative prediction mechanism will be used to predict the target addresses for return instructions.

The threshold amount considered at step 300 can be varied dependent on implementation. For example, in one particular implementation it may be determined that as soon as the confidence indication value is non-zero, then the threshold has been reached, i.e. that a single occurrence of misprediction is sufficient to switch from the trigger condition being absent to the trigger condition being present. However, if desired, the threshold can be set at a higher level, so that multiple occurrences of misprediction are required before the trigger condition is determined to be present.

Figure 7:
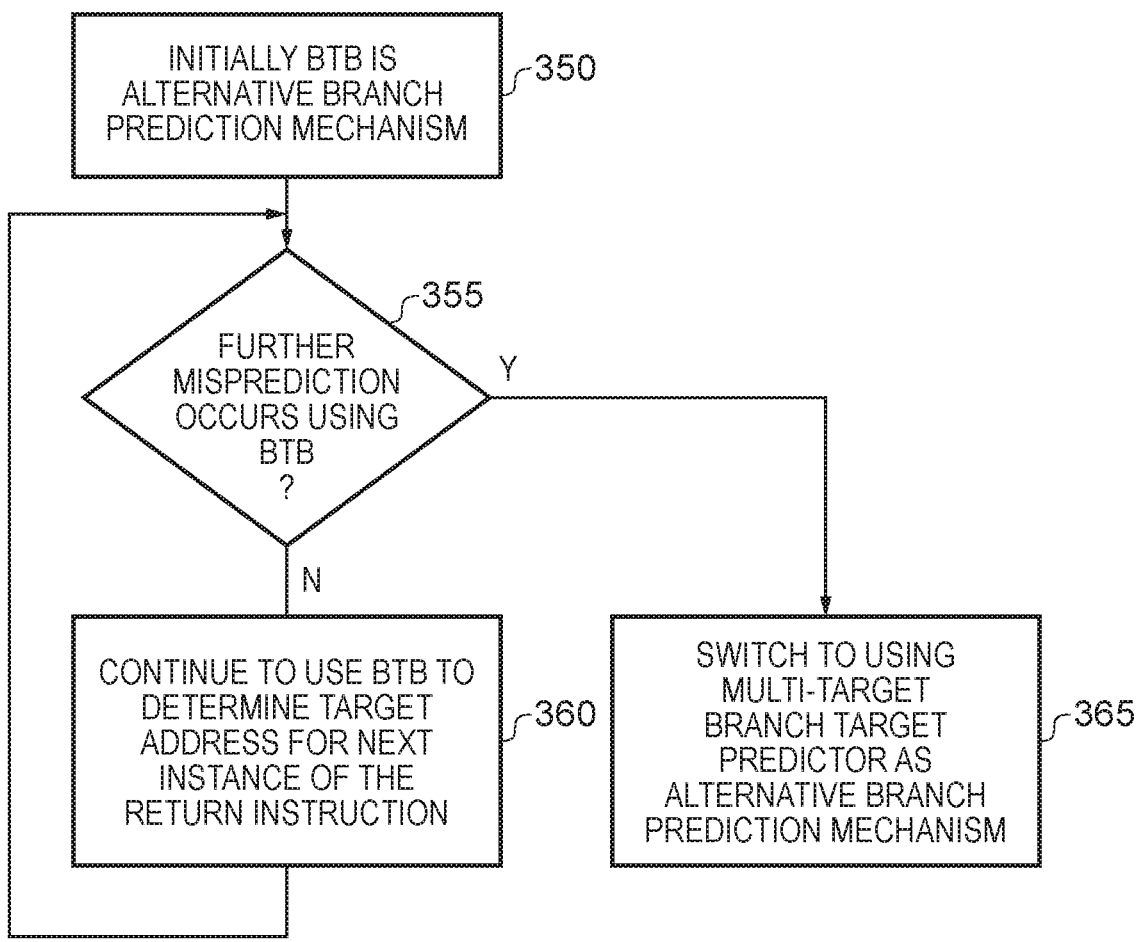
FIG. 7 is a flow diagram illustrating how the alternative branch prediction mechanism may be chosen in one example, once the trigger condition has been determined to be present.

In one example arrangement, in the presence of the trigger condition, the alternative branch prediction mechanism is initially set to be the BTB 105, and accordingly a branch target address within the field 170 of the hit entry will be used as the next predicted target address for the return instruction. However, as illustrated by FIG. 7, in one example arrangement, the alternative branch prediction mechanism can be changed if further mispredictions occur. In particular, at step 350 the BTB is initially chosen to be the alternative branch prediction mechanism, once the trigger condition has been determined to be present. However, at step 355 it is then determined whether a misprediction of the target address occurs using the BTB entry. If not, then this indicates a situation where the target address is static and the BTB is correctly identifying the target address. Accordingly, as indicated at step 360, the process continues to use the BTB to determine the target address for the next instance of the return instruction, i.e. when the return instruction at the same fetch address is next encountered. However, if a further misprediction does occur when using the BTB to predict the target address, then this can indicate a situation where the return instruction is polymorphic, and in that case the process proceeds to step 365, where a switch is made to using the multi-target branch target predictor as the alternative branch prediction mechanism. The return instruction may be polymorphic for a number of reasons, for example because there may be many branch with link instructions associated with the same return instruction (where a function may be called from different places in the code). Similarly there may be many return instructions associated with the same branch with link instruction (in situations where a function can have multiple exit points).

FIG. 8A is a diagram schematically illustrating operation of a call function, in this case implemented by a branch with link instruction. If the branch with link instruction is predicted as taken (it being noted that execution of the branch may be conditional), then the incremented address is stored in the link register as the return address. In this case, it is assumed that the branch with link instruction is at an address "X", and hence the address stored in the link register is "X+1", where the unit of addressing is assumed to be the instruction length. The target address of the branch with link instruction is in this instance determined from the contents of the register Xn and in this case it is assumed that the determined target address is the address "X+Y". It is then assumed that a function is performed, where the first instruction in that function is at the address X+Y, and at the end of the function a return instruction is used to return to the address X+1.

FIG. 8B illustrates the Retpoline software construct that can be used to protect against the branch target injection attack when executing indirect branch instructions. In particular, for indirect branch instructions, it would usually be the BTB that is used to predict the target address, but the software construct is such that instead predictions come from the return stack, and are mispredictions, and as such this effectively isolates the performance of indirect branch operations from speculative execution.

As shown in FIG. 8B, the branch instruction is replaced with a branch with link instruction that branches to the address "SET_UP_TARGET". With regards to the return address, the link register is initially set to the address "CAPTURE_SPEC" when the branch with link instruction is executed, and that address is also pushed onto the return stack at the time the branch with link instruction is encountered within the prediction circuitry. For the branch with link instruction itself, this is predicted as taken with the known target address of SET_UP_TARGET, but when a prediction is required for the associated return instruction, the address "CAPTURE_SPEC" will be popped from the return stack. As a result, speculative execution will start from the address "CAPTURE_SPEC", and as will be seen from FIG. 8B this just introduces a loop where the code keeps branching to itself during speculative execution. When the branch with link instruction is subsequently executed, the process branches to the SET_UP_TARGET address, where a move instruction is used to update the link register (in this case register X30) to the correct target address, based on the contents of the register Xn. A return instruction is then executed, causing the process to return to the intended target address for the original branch instruction.

As will be appreciated, this effectively prevents speculative execution being used to induce a branch target injection attack by training of the BTB, since the BTB is not used during speculative execution, and instead an incorrect branch prediction is made using the contents of the return stack. However, it does have a significant performance impact, since when the return instruction is in due course executed it will be determined that the misprediction was wrong, and accordingly corrective steps are required in order to fetch the instructions from the required target address.

However, as will be appreciated from the earlier discussion, this misprediction will be detected by the branch unit within the execute stage 18, and this misprediction information can be returned to the branch predictor 4 to cause update of the prediction control information 165 for the return instruction.

Accordingly, when it is known that the intended branch prediction mechanism for the original branch instruction, in this case the BTB 105, has been constructed in a way that is robust to branch target injection attacks, then the misprediction information returned from the execute stage of the pipeline can be used to adjust the prediction control information such that the trigger condition will then at some point be detected (as mentioned earlier in some instances a single misprediction may be sufficient for the trigger condition to be detected), and thereafter the branch prediction circuitry can switch to using an alternative branch prediction mechanism for predicting the target address. In particular, for a subsequent iteration of the return instruction, rather than predicting the address "CAPTURE_SPEC" based on the contents of the return stack, the BTB can instead be used to predict the proper target address based on the contents of register Xn, so that a further misprediction does not occur in association with the return instruction.

Whilst in one example arrangement, the feedback about the misprediction can be used to adjust the confidence indicator, in another example arrangement the branch circuitry 21 may be arranged to specifically detect use of the software construct, and to indicate the detection of the presence of the software construct to the branch prediction circuitry for use by the branch prediction circuitry in detecting presence of the trigger condition. This will hence enable an earlier detection of the use of the software construct, and hence an earlier switch to using the alternative branch prediction mechanism.

Figure 9:
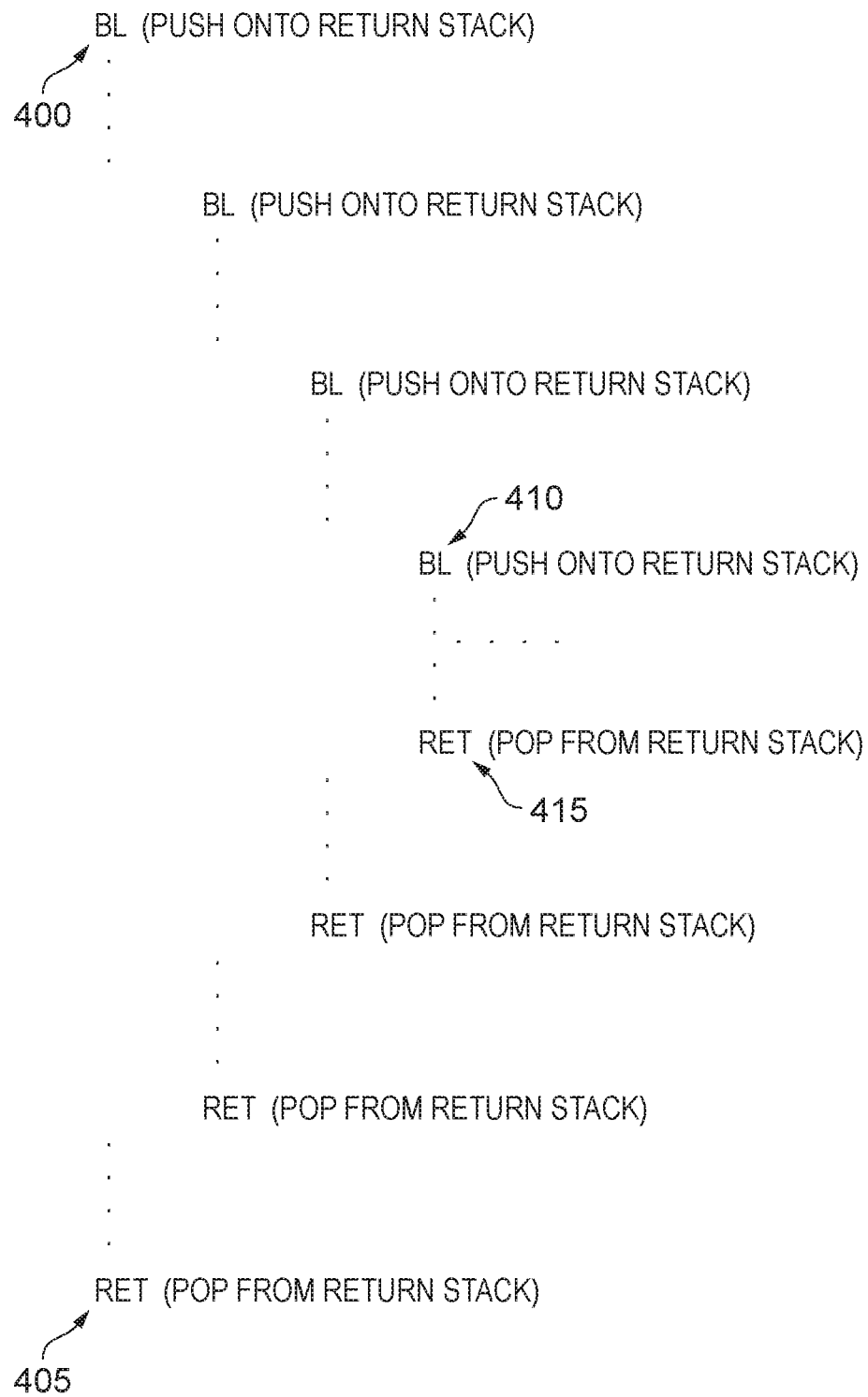
FIG. 9 schematically illustrates the use of nested code portions.

FIG. 9 illustrates another example scenario where the ability of the return stack to accurately predict return instructions may be compromised. In this case, it is assumed that the code executing on the processing circuitry comprises a significant number of nested code portions. Each code portion is initiated by a function call using a branch with link instruction, and is then ended by a function return implemented using a return instruction. Hence, the initial BL instruction 400 has an associated return instruction 405. Similarly, each other nested routine has a BL instruction and associated return instruction. Each time a BL instruction is encountered by the branch prediction circuitry, the return address (i.e. the next sequential address after the branch with link instruction) is pushed on to the return stack. Provided there are enough entries within the return stack, it will be seen that once the final branch with link instruction 410 has been encountered, then the return stack will contain all of the required target addresses for the corresponding return instructions. Due to the nested nature of the code portions, it will be seen that the return instructions associated with the later branch with link instructions (these return instructions being referred to herein as the later return instructions) will actually be encountered first in the branch prediction circuitry, and the relevant target address can be obtained merely by popping the top entry from the return stack in each case. However, if by the time one of the later branch with link instructions is encountered (let us assume this is the branch with link instruction 410 shown in FIG. 9), all of the entries within the return stack are currently populated, then the push of the target address for the associated return instruction 415 on to the return stack will cause the target address for the oldest return instruction, i.e. the instruction 405 to be overwritten (this being referred to as an overflow condition).

As a result, when in due course the return instruction 405 is encountered, the return stack will not have a valid entry left, and hence cannot predict the target address. This indicates a state of misprediction using the return stack, and at that point the trigger condition can be raised to cause the prediction of the target address to be obtained from an alternative branch prediction mechanism, for example the BTB. In one implementation, the trigger condition can be raised as soon as it is determined that the return stack does not have a valid entry to cause a switch to the alternative branch prediction mechanism at that point. However, if this was the first time this happened, it is likely that no target address associated with the return instruction will be found in the alternative branch prediction mechanism (in one example the BTB), and therefore the first time a misprediction would occur in respect of the return instruction using the alternative branch prediction mechanism. However, this will cause an allocation of the target address to be made in the BTB, thus enabling following predictions for that return instruction to be accurately made using the BTB contents.

Figure 10:
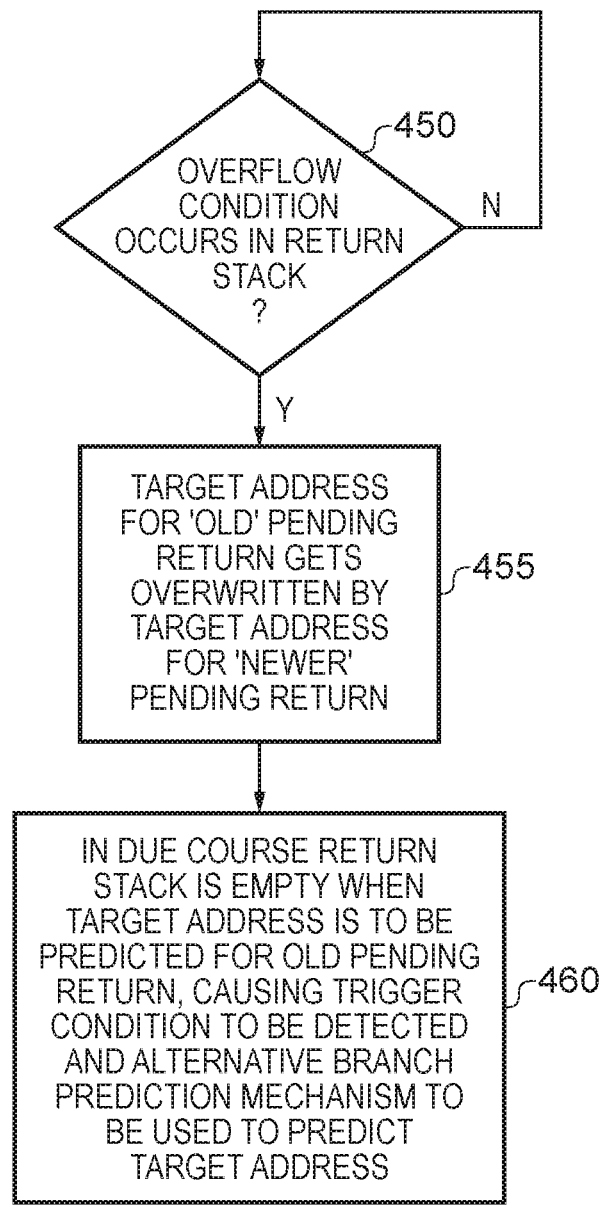
FIG. 10 is a flow diagram illustrating how an overflow within the return stack due to the extent to which nested code portions are used may result in a misprediction, and the switch to the use of an alternative branch prediction mechanism, in accordance with one example arrangement.

This process is illustrated in FIG. 10. In particular, at step 450 it is determined whether an overflow condition has occurred in respect of the return stack. As mentioned earlier, this will occur when the degree of nesting is high enough that target address information that has not yet been consumed by the relevant return instruction is overwritten by new target address information for a later return instruction. Hence, in the presence of the overflow condition at step 450, the target address for an old pending return gets overwritten by the target address for a newer pending return. As discussed earlier with reference to FIG. 9, due to the nested nature of the code portions, it is actually the newer pending returns that execute first.

At step 460, in due course the return stack will be empty when the target address is to be predicted for the old pending return whose target address was overwritten, causing the trigger condition to be detected and an alternative branch prediction mechanism to be used to predict the target address.

Hence, in the example illustrated in FIG. 10, the trigger condition is detected when the return stack is empty at the time a target address is to be predicted for the return instruction. In one example arrangement, if the same return instruction is encountered in the future, and at that time the return stack is not empty (meaning that no overflow has occurred this time), then the trigger condition will not be detected and the return stack will be used as normal to predict the target address.

From the above described examples, it can be seen that when the trigger condition is detected, the alternative branch prediction mechanism can be used to make a prediction for the current instance of the return instruction, or for one or more subsequent instances of the return instruction.

A decision as to when to populate the alternative branch prediction mechanism so that it is able to make a target address prediction for the return instruction can be varied dependent on implementation. Effectively, there is a trade-off that can be tuned having regards to any particular implementation case. The sooner target address information is allocated in the alternative branch prediction mechanism, the sooner correct predictions can be made using that allocated target address information when the trigger condition is detected. However, if that target address information is populated in the alternative branch prediction mechanism even before the trigger condition is present, there is the potential that that information will not be needed, and hence allocation of that information can pollute the alternative branch prediction mechanism by wasting space that could be used for making predictions in respect of other branch instructions.

In one example implementation, the BTB will already have an entry for the return instruction, and will by default be identifying that the return stack should be used for the target address. However even before the trigger condition has been detected, the target address field 170 within the BTB could be populated with a predicted target address, so that once the trigger condition has been detected, the BTB is in a position to predict a target address for a current or subsequent instance of the return instruction. In situations where the multi-target branch target predictor 115 is to be used as the alternative branch prediction mechanism, then a decision can be made as to the point at which an entry is allocated into the multi-target branch target predictor for the relevant return instruction so that it can begin to provide target addresses wen called upon. It is likely that that step will not be taken significantly ahead of the trigger condition being detected, as it will be undesirable to utilise an entry of the multi-target branch target predictor unnecessarily. Indeed, in some instances an entry in the multi-target branch target predictor will not be made until after the trigger condition has been detected.

It has been found that the above described techniques can provide a mechanism for improving the efficiency of branch prediction in certain situations.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions; and
branch prediction circuitry comprising a plurality of branch prediction mechanisms used to predict target addresses for branch instructions to be executed by the processing circuitry, the branch instructions comprising a plurality of branch types, where one branch type is a return instruction;
wherein the branch prediction mechanisms include a return prediction mechanism comprising a return stack used by default to predict a target address when a return instruction is detected by the branch prediction circuitry, wherein each target address pushed onto the return stack is a return address calculated for a function call and forms an entry on the return stack, and each time the return stack is used to predict a target address for a return instruction detected by the branch prediction circuitry the return stack is arranged to determine the predicted target address for that return instruction by popping an entry from the return stack;
the branch prediction circuitry being responsive to a trigger condition indicative of misprediction of the target address when using the entry popped from the return stack to predict the target address for one or more preceding instances of a given return instruction, to switch to using an alternative branch prediction mechanism for predicting the target address for at least one subsequent instance of the given return instruction.

2. An apparatus as claimed in claim 1, wherein the branch prediction circuitry is arranged to maintain prediction control information for one or more return instructions, for each return instruction the prediction control information identifying whether the trigger condition is present or absent, thereby controlling for each return instruction whether the target address for that return instruction is predicted using the return prediction mechanism or using the alternative branch prediction mechanism.

3. An apparatus as claimed in claim 2, wherein when the processing circuitry executes the given return instruction, the processing circuitry is arranged to determine whether the target address determined by the branch prediction circuitry was correct, and to provide to the branch prediction circuitry feedback information indicative of whether the target address determined by the branch prediction circuitry was correct, the branch prediction circuitry being arranged to use the feedback information to maintain the prediction control information.

4. An apparatus as claimed in claim 2, wherein:
the prediction control information comprises a confidence indication indicating, for the associated return instruction, a level of misprediction observed when using the return prediction mechanism to predict the target address for that associated return instruction; and the trigger condition exists when the level of misprediction indicated by the confidence indication reaches a chosen level of misprediction.

5. An apparatus as claimed in claim 4, wherein the chosen level of misprediction comprises a single instance of misprediction being confirmed by the processing circuitry for the associated return instruction, such that following the single instance of misprediction, the confidence indication causes the branch prediction circuitry to use the alternative branch prediction mechanism for predicting the target address for at least one subsequent instance of that associated return instruction.

6. An apparatus as claimed in claim 4, wherein the chosen level of misprediction comprises a determined plurality of instances of misprediction being confirmed by the processing circuitry for the associated return instruction, for each instance of misprediction the branch prediction circuitry being arranged to adjust a value of the confidence indication, such that following the determined plurality of instances of misprediction, the confidence indication has a value indicating the trigger condition so as to cause the branch prediction circuitry to use the alternative branch prediction mechanism for predicting the target address for at least one subsequent instance of that associated return instruction.

7. An apparatus as claimed in claim 6, wherein the confidence indication is initialised to an initial value, and the branch prediction circuitry is arranged to increment the confidence indication in response to each instance of misprediction.

8. An apparatus as claimed in claim 7, wherein, whilst the confidence indication is greater than the initial value, the branch prediction circuitry is arranged to decrement the confidence indication in response to each instance of correct prediction.

9. An apparatus as claimed in claim 2, wherein:
the plurality of branch prediction mechanisms comprises a branch target buffer having a plurality of entries, each entry maintaining a memory address indication and a branch type indication to identify the branch type for a branch instruction predicted in association with the memory address indication, wherein the branch type indication is used by default to determine the branch prediction mechanism used to predict target addresses for the branch instruction predicted by that entry.

10. An apparatus as claimed in claim 9, wherein the branch target buffer is arranged to maintain the prediction control information in each entry for which the predicted branch type is a return instruction.

11. An apparatus as claimed in claim 10, wherein the prediction control information is encoded with the branch type indication such that in the absence of the trigger condition the branch type indication identifies that the return prediction mechanism is to be used to predict the target address for the associated return instruction, and in the presence of the trigger condition the branch type indication identifies that the alternative branch prediction mechanism is to be used to predict the target address for the associated return instruction.

12. An apparatus as claimed in claim 9, wherein each entry in the branch target buffer comprises a target address field to indicate a target address when a branch instruction is predicted in association with the memory address indication, and the branch target buffer comprises the alternative branch prediction mechanism.

13. An apparatus as claimed in claim 1, wherein the alternative branch target prediction mechanism is a multi-target branch target prediction mechanism used to predict target addresses of branch instructions which are polymorphic.

14. An apparatus as claimed in claim 1, wherein:
the processing circuitry is arranged to execute software employing a software construct to cause branch mispredictions when executing indirect branch instructions, by causing mispredicted target addresses to be obtained from the return prediction mechanism rather than via an intended branch prediction mechanism in situations where the intended branch prediction mechanism is vulnerable to being utilised to implement a branch target injection attack;
the branch prediction circuitry comprises the intended branch prediction mechanism, but is configured to be robust against the branch target injection attack; and
the alternative branch prediction mechanism comprises the intended branch prediction mechanism, and use of the trigger condition enables the mispredictions caused by the software construct to be detected, and for subsequent predictions to be made using the intended branch prediction mechanism.

15. An apparatus as claimed in claim 14, wherein the processing circuitry comprises detection circuitry to detect use of the software construct, and to indicate the detection to the branch prediction circuitry for use by the branch prediction circuitry in detecting presence of the trigger condition.

16. An apparatus as claimed in claim 1, wherein:
the processing circuitry is arranged to execute software comprising multiple nested code portions, each nested code portion having an associated return instruction;
the multiple nested code portions are sufficient to cause an overflow condition in the return prediction mechanism where at least one target address for an older pending return instruction is overwritten with a target address for a later pending return instruction;
wherein when a prediction of the target address is to be made for the older pending return instruction, absence of a relevant entry within the return prediction mechanism is arranged to cause the trigger condition to be detected such that the alternative branch prediction mechanism is used to predict the target address.

17. A method of controlling branch prediction in an apparatus having processing circuitry to execute instructions, the method comprising:
providing branch prediction circuitry comprising a plurality of branch prediction mechanisms used to predict target addresses for branch instructions to be executed by the processing circuitry, the branch instructions comprising a plurality of branch types, where one branch type is a return instruction;
using by default a return prediction mechanism amongst the plurality of branch prediction mechanisms to predict a target address when a return instruction is detected by the branch prediction circuitry, wherein the return prediction mechanism comprises a return stack, each target address pushed onto the return stack is a return address calculated for a function call and forms an entry on the return stack, and each time the return stack is used to predict a target address for a return instruction detected by the branch prediction circuitry the return stack is arranged to determine the predicted target address for that return instruction by popping an entry from the return stack; and responsive to a trigger condition indicative of misprediction of the target address when using the entry popped from the return stack to predict the target address for one or more preceding instances of a given return instruction, switching to using an alternative branch prediction mechanism amongst the plurality of branch prediction mechanisms for predicting the target address for at least one subsequent instance of the given return instruction.

18. An apparatus comprising:

processing means for executing instructions; and branch prediction means comprising a plurality of branch prediction mechanisms for use when predicting target addresses for branch instructions to be executed by the processing means, the branch instructions comprising a plurality of branch types, where one branch type is a return instruction;

wherein the branch prediction mechanisms include a return prediction mechanism comprising a return stack used by default to predict a target address when a return instruction is detected by the branch prediction means, wherein each target address pushed onto the return stack is a return address calculated for a function call and forms an entry on the return stack, and each time the return stack is used to predict a target address for a return instruction detected by the branch prediction means the return stack is arranged to determine the predicted target address for that return instruction by popping an entry from the return stack;

the branch prediction means, responsive to a trigger condition indicative of misprediction of the target address when using the entry popped from the return stack to predict the target address for one or more preceding instances of a given return instruction, for switching to using an alternative branch prediction mechanism for predicting the target address for at least one subsequent instance of the given return instruction.

* * * * *